United States Patent
Magnussen

(10) Patent No.: US 6,591,216 B1
(45) Date of Patent: Jul. 8, 2003

(54) DEVICE AND METHOD FOR DETERMINING A SPATIAL POSITION OF AN OBJECT

(75) Inventor: Björn Magnussen, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,074

(22) PCT Filed: Jul. 1, 1999

(86) PCT No.: PCT/DE99/02007

§ 371 (c)(1),
(2), (4) Date: Jan. 4, 2001

(87) PCT Pub. No.: WO00/03200

PCT Pub. Date: Jan. 20, 2000

(30) Foreign Application Priority Data

Jul. 9, 1998 (DE) .......................................... 198 30 833

(51) Int. Cl.⁷ .............................................. G06F 15/00
(52) U.S. Cl. ....................................... 702/134; 318/580
(58) Field of Search ........................ 318/580; 340/584; 702/99, 134; 250/330

(56) References Cited

U.S. PATENT DOCUMENTS

| | | |
|---|---|---|
| 4,510,390 A | 4/1985 | Rajchman |
| 5,369,347 A | 11/1994 | Yoo |
| 5,691,921 A * | 11/1997 | Berlin .......................... 702/99 |
| 5,877,688 A * | 3/1999 | Morinaka et al. ............ 340/584 |
| 6,255,793 B1 * | 7/2001 | Peless et al. .................. 318/580 |

FOREIGN PATENT DOCUMENTS

| | | |
|---|---|---|
| DE | 35 36 974 A1 | 4/1987 |
| DE | 40 23 952 A1 | 2/1992 |
| DE | 44 15 736 A1 | 11/1995 |
| DE | 195 05 826 A1 | 8/1996 |

OTHER PUBLICATIONS

Patent Abstracts of Japan—European Patent Office 05060630—Dec. 3, 1993.
Integriertes hierarchisches Navigationssystem für autonome mobile Roboter—Bauer Apr. 1996.
A 11x6 Element Pyroelectric Detector p. 361–376 1997 vol. 7.
XP–000776369 Russell—1997 IEEE.
Patent Abstracts of Japan—05011839—Jan. 22, 1993.

* cited by examiner

*Primary Examiner*—Michael Nghiem
*Assistant Examiner*—Xiuqin Sun
(74) *Attorney, Agent, or Firm*—Schiff Hardin & Waite

(57) ABSTRACT

In an arrangement and method for determining a spatial position of an object on a thermal basis, an imaging thermal sensor detects a thermal image of the environment and outputs corresponding signals to a processing unit coupled to the sensor. The processing unit accepts the signals, evaluates the image in view of a thermal marking, and determines the spatial position of the object dependent on the marking. The arrangement and the method can be employed in combination with a robot for orientation and for travel path control of the robot.

15 Claims, 2 Drawing Sheets

DEVICE AND METHOD FOR DETERMINING A SPATIAL POSITION OF AN OBJECT

BACKGROUND OF THE INVENTION

The invention is directed to the determination of a spatial position of an object.

The use of an autonomous robot system in industry is steadily increasing. The point of departure was the use of a robot system in fabrication. This robot system was thereby utilized in stationary fashion in order to implement repetitive but unchanging and permanently prescribed motion sequences. The demand for precision is thereby in the foreground. The disadvantage of this robot system is that it is bound to a location and, thus, has little flexibility.

T. Cord et al., Mobile autonome Roboter zum Transport von Containern, 11. Fachgespräch, Karlsruhe, Eds. R. Dillmann, U. Rembold, T. Lüth, Springer Verlag, Berlin, Heidelberg, New York, pp. 1–9, 1995 discloses a mobile robot system that is no longer stationary but can move by itself. The navigation of the movement is thereby accomplished with specific preparations in the environment of the robot.

One example of this robot system is the driverless transport system that is used for transporting materials. This system is usually track-guided, i.e. it follows a fixed path. This concept has proven itself in practice but has the disadvantage that it is extremely inflexible—see DE 35 369 74 A1. This is to be attributed thereto that the navigation control of the robot system ensues with a permanently present guide track Cord et al, supra. Before the transport robot is placed in operation, this is permanently introduced into the floor in the form of an electrical conductor along the travel path. An involved re-laying of the conductor is required given a change of the path guidance. The old conductor must be removed from the floor, the floor covering must be repaired, the new path guidance must be defined and the conductor must be placed into the floor along the new path. This denotes a great time expenditure and high costs.

R. Bauer, Integriertes hieracrhisches Navigationssystem für autonome mobile Roboter, pp. 17–23, pp. 35–41, Dissertation, Linz University, 1997 discloses an autonomous mobile robot system that is in the position of orienting itself, navigating and autonomously implementing a predetermined task in a dynamically changing environment completely independently without requiring a great expense for the preparation of the environment.

Various types of a position identification and navigation system have been developed therefor—Bauer. Such a system usually works on the basis of an imaging sensor. A sensor that detects the surroundings of the robot is thereby attached to the robot. Upon employment of a standard programmable computer, the sensor data are interpreted and a plot of the environment, similar to a map, is built up.

This map is interpreted in computer-supported fashion. Taking the kinematic and geometrical properties as well as the current position of the robot into consideration, the best possible navigation for a predetermined task is identified—DE 44 157 36 A1.

It is known from Bauer to employ an ultrasound sensor, a laser sensor or a stereo camera system as the sensor in a mobile robot.

The sensor system known from Bauer, however, exhibits a variety of disadvantages. Thus, the laser sensor or the stereo camera system is too expensive for the measurement use. In contrast thereto, the ultrasound sensor in fact has a low price and great ruggedness. However, the precision of such a sensor, its susceptibility to disturbance with respect to a temperature fluctuation, an external signal or a multiple reflection and the low range of the sensor make the use thereof only conditionally possible.

R. Bruchhaus, D. Pitzer, R. Primig, M. Schreiter, W. Wersing, N. Neumann, N. Hess, J. Vollheim, R. Köhler, M. Simon, An 11×6 Element Pyroelectric Detector Array Utilizing Self-Polarized PZT Thin Film Grown by Sputtering, Integrated Ferroelectrics, Vol. 17, pp. 369–376, 1997 also discloses that a pyroelectric material be employed for the development of a thermal sensor.

SUMMARY OF THE INVENTION

It is an object of the invention to determine the spatial position of an object in a flexible and cost-beneficial way.

According to the arrangement of the invention for determining a spatial position of the first object, an imaging thermal sensor is provided. A processing unit coupled to the sensor is provided with which a spatial position of the first object is identifiable from corresponding signals of the sensor with reference to at least one thermal marking that is acquired by the sensor. In a method of the invention for determining a spatial position of the first object with an imaging thermal sensor and a processing unit coupled to the sensor, with the sensor detecting a thermal image of the environment and outputting corresponding signals to the processing unit. With the processing unit, accepting the signals, evaluating the image in view of at least one thermal marking, and determining a spatial position of the first object dependent on the marking.

The arrangement for determining a spatial position of a first object comprises an imaging thermal sensor and a processing unit coupled to the sensor. The processing unit is configured such that the spatial position of the first object can be determined from corresponding signals of the sensor on the basis of at least one thermal marking that is acquired by the thermal sensor.

An object whose temperature differs from an ambient temperature is employed as thermal marking. The ambient temperature is the temperature in the environment of the first object.

In the method for determining a spatial position of a first object with an imaging thermal sensor and a processing unit coupled to the sensor, the following steps are implemented:
a) the sensor detects a thermal image of the environment and outputs corresponding signals to the processing unit;
b) the processing unit picks up the signals, evaluates the image in view of at least one thermal marking and determines the spatial position of the first object dependent on the marking.

The invention creates a very simple and cost-beneficial system for position determination since low costs are incurred both for the production of the imaging thermal sensor as well as for the creation of a thermal marking.

In particular, the possibility of being able to use a heat source that already exists, for instance a lighting member, or a thermal track that has arisen in a natural way, for instance a damp cleaning track, as the thermal marking make the invention attractive and practical.

In addition to these advantages, the employment of a thermal marking has the advantage that it is usually not visible for a person and is thus not disturbing.

The imaging thermal sensor is preferably a sensor with a pyroelectric thin-film. The sensor can thus be implemented as a very small and cost-beneficial component part.

It is provided in a further development that the arrangement comprises a unit that acts such on a second object such that the temperature of the second object differs from an ambient temperature and the second object can be recognized as the thermal marking. The advantage of this embodiment is comprised therein that a system that can be very flexibly utilized results due to the interaction of the first and second object.

The unit is preferably configured such that the second object is moistened with fluid, as a result whereof the temperature of the second object differs from the ambient temperature. And the second object can be recognized as the thermal marking. The advantage of this embodiment is comprised in the extremely simple and cost-beneficial way in which the thermal marking is produced.

Another advantageous development in view of the simplicity and compactness of the arrangement derives when the unit that acts on the subject object is the first object.

An especially simple structure of the arrangement derives when the imaging thermal sensor is attached to the first object.

The arrangement is preferably utilized such that the first object is a robot. In this way, there is a very simple, flexible and economical system for position determination for the robot.

DESCRIPTION OF THE PREFERRED EMBODIMENTS

1. Orientation of a Robot at a Thermal Track Generated by the Robot Itself

Figure 1:
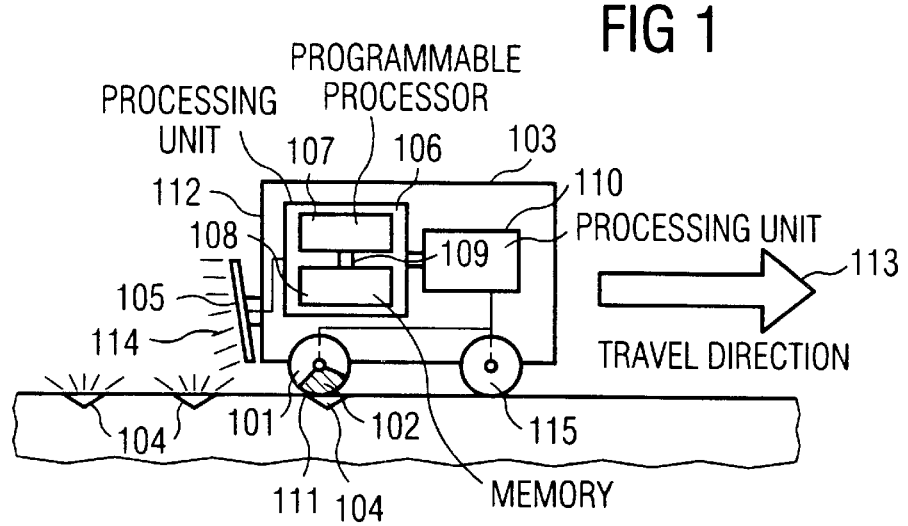
FIG. 1 shows an orientation of a robot at a thermal track generated by the robot itself.

FIG. 1 shows the orientation of a robot 103 at a thermal track 104 generated by the robot 103 itself.

By heating a sector 111 of a rear wheel 101 of the robot 103 with a heating element 102 worked into the rear wheel 101, the robot 103 heats elements at the floor 104 at predetermined intervals while travelling. Until they have completely cooled, these heated floor elements 104 act on the ambient temperature as thermal markings and form the thermal track 104.

The imaging thermal sensor 105 attached to the back side 112 of the robot 103 detects an ambient image 114 directed opposite the travel direction 113 of the robot 103 at predetermined time intervals. The sensor 105 is designed as described in Bruchaus et al.

Given straight-line travel of the robot 103, the sensor 105 supplies a thermal ambient image 114 directed opposite the travel direction 113 wherein the detected thermal markings 104 exhibit a very specific order. Deviations from the straight-line travel leads to changes in the thermal image 114. The thermal image 114 is stored in a processing unit 106 coupled to the sensor 105 that comprises a programmable processor 107 and a memory 108 that are connected to one another via a bus 109. The processor 107 reads the thermal image 114 from the memory 108 and determines the nature and extent of the deviation from the predetermined travel direction 113 from the modification of the thermal image 114.

The processor 107 determines a steering quantity therefrom that is transmitted to a steering unit 110 coupled to the processing unit 106. Dependent on the transmitted steering quantity, the steering unit 110 positions the wheels 101, 115 of the robot such that the deviation from the straight-line travel is compensated.

2. Orientation of an Autonomous Cleaning Robot

Figure 2:
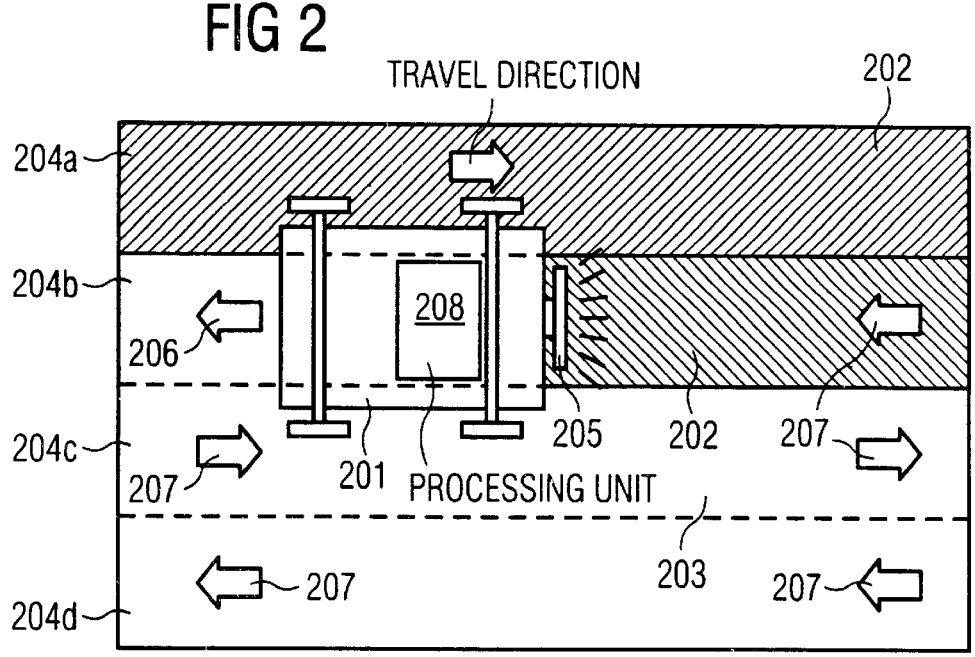
FIG. 2 shows orientation of a cleaning robot.

FIG. 2 shows the orientation of the robot, which is utilized as cleaning robot 201, at a fluid track 202 produced by the robot 201 itself.

Due to the dissipated evaporation energy of the fluid, damp floor elements 202 cool off compared to the ambient temperature and form a thermal track 202. For orientation of the cleaning robot 201, this is utilized for two steering tasks:

The cleaning robot 201 employs the self-generated thermal track 202, as shown in exemplary embodiment 1, for controlling the straight-line travel 206.

For an efficient cleaning of a surface 203 that is covered by adjoining cleaning paths 204a–d that proceed parallel to one another and are laterally offset by the width of the cleaning robot 201 and traversed by the cleaning robot 201 in alternating travel direction 207, the cleaning robot 201 orients the cleaning path 204b being currently traversed by it with reference to the thermal track 202 that was generated while travelling on the previously traversed cleaning path 204a.

The arrangement of the thermal sensor 105, the structure and the functioning of the processing unit 106 is shown in exemplary embodiment 1.

3. Segregation from a Hazardozus Region with a Thermal Marking

Figure 3:
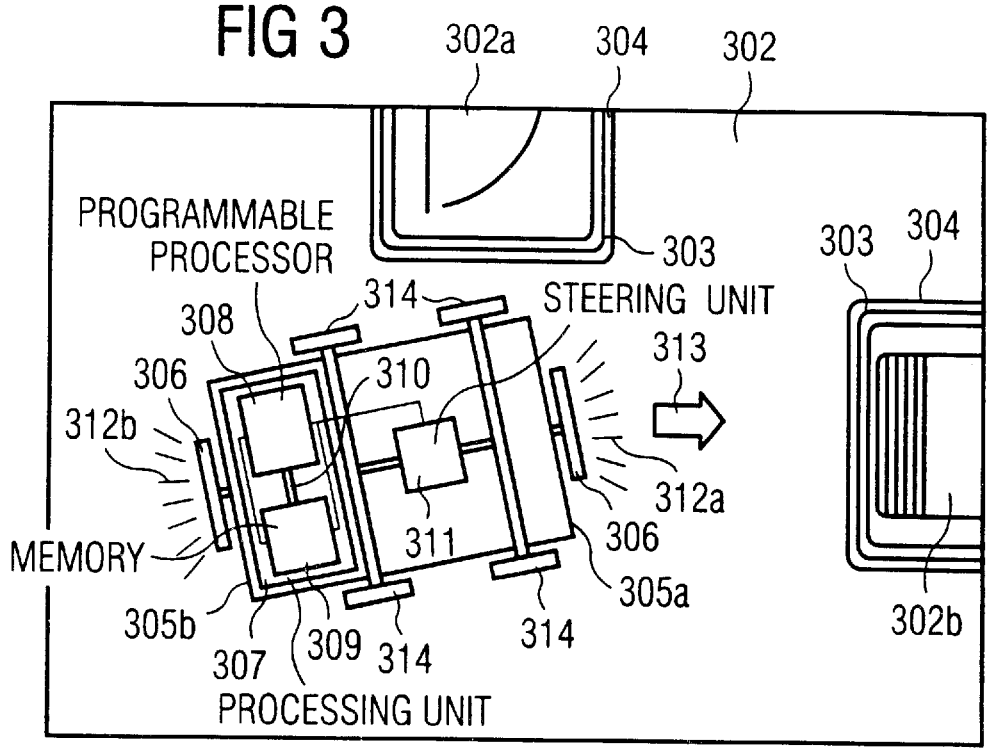
FIG. 3 shows securing against a hazardous region with a thermal marking.

Another exemplary embodiment is shown in FIG. 3 and is explained in greater detail below.

FIG. 3 shows an embodiment of the invention wherein the thermal sensor is employed in order to prevent the penetration of the robot 301 into a spatial region 302a,b demarcated with a thermal marking 303. This is necessary when a region 302a,b of the room 302 accessible to the robot comprises a risk potential. Such a region 302a,b is the zone in the environment of an opening door 302a or a stair step 302b;

For this purpose, a resistance wire 303 is let into the floor that limits the region 302a,b dangerous to the robot 301 at a prescribable safety distance. The resistance wire heats the adjacent floor elements 304 to a predetermined temperature and generates the thermal marking 304.

A thermal sensor 306 that supplies the thermal ambient image in 312a travel direction 313 and opposite the 312b travel direction 313 of the robot 301 is attached to the front side 305a and to the back side 305b of the robot. The sensor 306 that is employed is designed as disclosed in Bruchhaus.

Due to the predetermined temperature, the thermal marking 304 expresses itself in this thermal image 312a,b in a way that can be unambiguously recognized by a processing unit 307.

The thermal image 312a,b is stored in a processing unit 307 coupled to the sensor 306, said processing unit 307 comprising a programmable processor 308 and a memory 309 that are connected to one another via a bus 310. The processor 308 reads the thermal image 312a,b from the memory 309 and, based on the orientation of the thermal marking 304 in the thermal image 312a,b, determines the position of the robot 301 relative to the thermal marking 304.

Dependent on the identified position, the processor 308 calculates a steering quantity that is transmitted to a steering unit 311 coupled to the processing unit 307. The steering unit 311 positions the wheels 314 of the robot 301 such dependent on the transmitted steering quantity such that the robot does not travel across the thermal marking 304.

4. Recognizing a Human Obstacle

Figure 4:
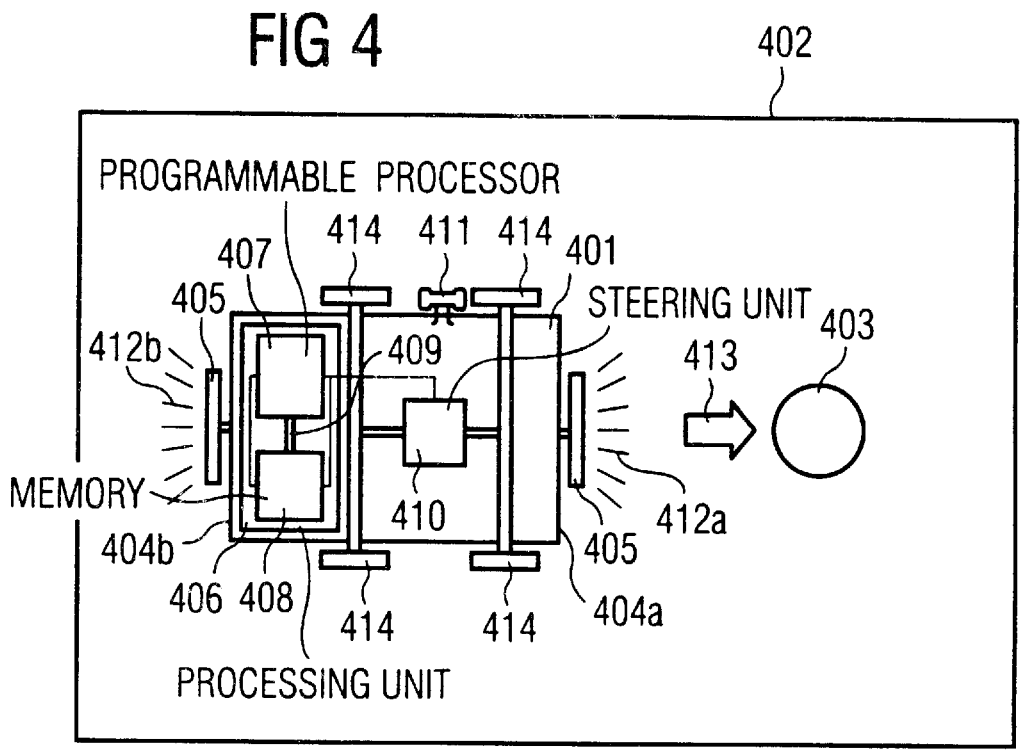
FIG. 4 illustrates recognition of a human obstacle.

Another exemplary embodiment is shown in FIG. 4 and is explained in greater detail below.

When a mobile robot 401 is placed in a room 402 that is accessible to a person 403, then the person 403 located in this room represents an obstacle for the robot 401. Due, however, to the natural body heat, the person 403 is recognized as a human-specific thermal marking.

A thermal sensor 405 that supplies the thermal ambient image in 412a travel direction 413 and opposite 412b the travel direction 413 of the robot 401 is attached to the front side 405a and to the back side 405b of the robot. The sensor 405 that is employed is designed as disclosed in Bruchhaus.

Due to the body heat, the human-specific thermal marking 403 expresses itself in this thermal image 412a,b in a way that can be unambiguously recognized by a processing unit 406.

The thermal image 412a,b is stored in a processing unit 406 coupled to the sensor 405, said processing unit 406 comprising a programmable processor 407 and a memory 408 that are connected to one another via a bus 409. The processor 407 reads the thermal image 412a,b from the memory 408 and, based on the orientation of the thermal marking 404 in the thermal image 412a,b, determines the position of the robot 401 relative to the thermal marking 403.

Dependent on the identified position, the processor 407 calculates a steering quantity that is transmitted to a steering unit 410 coupled to the processing unit 406. The steering unit 410 positions the wheels 414 of the robot 401 dependent on the transmitted steering quantity such that the robot travels around the thermal marking 403 at a predetermined safety distance.

A few modifications of the above-described exemplary embodiment are explained below.

In order to prevent a collision between the robot 401 and the person 403, the steering unit 410, dependent on the identified position of the robot 401, can stop the travel by shutting off the robot 401.

It is also provided to attach a warning device 411 to the robot 401 that supplies an audio-visual alarm signal dependent on the identified position of the robot 401.

Although various minor changes and modifications might be proposed by those skilled in the art, it will be understood that my wish is to include within the claims of the patent warranted hereon all such changes and modifications as reasonably come within my contribution to the art.

I claim:

1. An arrangement for determining a spatial position of a first object, comprising:
   an imaging thermal sensor which provides signals indicative of a thermal image of an environment where the first object is located;
   a thermal marking device which thermally marks one or more regions of said environment; and
   a processing unit coupled to the sensor which generates said thermal image of the environment, which detects the thermal marking in said environment, and which determines said spatial position of said first object based on the detected thermal marking in the thermal image of the environment.

2. The arrangement according to claim 1 wherein the processing unit is configured such that the spatial position of the first object is identifiable from imaging signals of the sensor on the basis of a plurality of thermal markings that are acquired by the sensor.

3. The arrangement according to claim 1, whereby the imaging thermal sensor is a sensor with a pyroelectric thin film.

4. The arrangement according to claim 1 further comprising a unit that acts on a second object such that the temperature of the second object is different compared to the ambient temperature and the second object is recognizable as a thermal marking.

5. The arrangement according to claim 4 whereby the unit is configured such that the second object is moistened with fluid, so that the temperature of the second object is different compared to the ambient temperature and the second object is recognizable as a thermal marking.

6. The arrangement according to claim 4 wherein the unit that acts on the second object is the first object.

7. The arrangement according to claim 1 wherein the imaging thermal sensor is attached to the first object.

8. The arrangement according to claim 1 wherein the first object is a robot.

9. A method for determining a spatial position of a first object with an imaging thermal sensor and a processing unit coupled to the sensor, comprising the steps of:
   thermally marking one or more regions of an environment in which the first object is located;
   with the sensor detecting a thermal image of said environment and outputting corresponding signals to the processing unit;
   also with said sensor detecting said thermal marking in said environment; and
   with the processing unit, based on the signals from the sensor generating a thermal image of the environment and interpreting that thermal image to detect the thermal marking in the thermal image, and determining said spatial position of said first object in the environment based on the detected thermal marking in the thermal image.

10. The method according to claim 9 wherein the image is evaluated in view of a plurality of thermal markings and the spatial position of the first object is determined dependent on the thermal markings.

11. The method according to claim 9 whereby a temperature of a second object is modified such that the second object is recognized as a thermal marking.

12. The method according to claim 11 whereby the second object is moistened with fluid such that the temperature of the second object is different compared to ambient temperature and the second object is thus recognized as a thermal marking.

13. The method according to claim 9 whereby the processing unit determines a relative position of the first object with respect to the thermal marking from signals of the sensor.

14. The method according to claim 9 wherein the processing unit determines an absolute position of the first object from signals of the sensor.

15. A method for determining a spatial position of a first object with an imaging thermal sensor and a processing unit coupled to the sensor, comprising the steps of:
   thermally marking a plurality of regions of an environment in which the first object is located;
   with the sensor detecting a thermal image of said environment and outputting corresponding signals to the processing unit;
   also with said sensor detecting said thermal marking in said environment; and
   with the processing unit, based on the signals from the sensor generating a thermal image of the environment and interpreting that thermal image to detect the thermal marking in the thermal image, and determining said spatial position of said first object in the environment based on the detected thermal marking in the thermal image.

* * * * *